(12) United States Patent
Kim et al.

(10) Patent No.: US 9,482,910 B2
(45) Date of Patent: Nov. 1, 2016

(54) DISPLAY DEVICE

(71) Applicant: Samsung Display Co., Ltd., Yongin (KR)

(72) Inventors: Sunghwan Kim, Yongin-si (KR); Jangmi Kang, Bucheon-si (KR); Se Hyoung Cho, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 114 days.

(21) Appl. No.: 14/592,692

(22) Filed: Jan. 8, 2015

(65) Prior Publication Data
US 2015/0277193 A1 Oct. 1, 2015

(30) Foreign Application Priority Data

Mar. 28, 2014 (KR) .................... 10-2014-0036667

(51) Int. Cl.
*G02F 1/1343* (2006.01)
*G02F 1/1337* (2006.01)

(52) U.S. Cl.
CPC ... *G02F 1/134336* (2013.01); *G02F 1/133707* (2013.01); *G02F 2001/134345* (2013.01)

(58) Field of Classification Search
CPC .................................................. G02F 1/1343
See application file for complete search history.

(56) References Cited

U.S. PATENT DOCUMENTS

| | | | |
|---|---|---|---|
| 7,847,912 B2 | 12/2010 | Nishizawa et al. | |
| 8,253,907 B2* | 8/2012 | Park | G02F 1/1323 349/106 |
| 8,325,308 B2* | 12/2012 | Nishimura | G02F 1/134363 349/126 |
| 8,342,462 B2 | 1/2013 | Sapper et al. | |
| 8,698,988 B2* | 4/2014 | Matsushima | G02F 1/1323 349/106 |
| 8,698,989 B2* | 4/2014 | Sugiura | G02F 1/1323 349/130 |
| 9,099,048 B2* | 8/2015 | Matsushima | G09G 3/3607 |
| 9,104,074 B2* | 8/2015 | Yeh | G02F 1/1323 |
| 2006/0061721 A1* | 3/2006 | Mimura | G02F 1/133605 349/139 |
| 2007/0146610 A1* | 6/2007 | Momoi | G02F 1/133753 349/144 |
| 2007/0153196 A1* | 7/2007 | Jang | G02F 1/1323 349/141 |
| 2007/0153200 A1* | 7/2007 | Kazuyoshi | G02F 1/133707 349/141 |
| 2007/0176872 A1* | 8/2007 | Kazuyoshi | G02F 1/134363 345/90 |
| 2007/0200989 A1* | 8/2007 | Shinichi | G02F 1/134309 349/129 |
| 2008/0259264 A1* | 10/2008 | Jin | G02F 1/1323 349/146 |
| 2009/0231530 A1* | 9/2009 | Nishimura | G02F 1/1323 349/129 |
| 2015/0042939 A1* | 2/2015 | Park | G02F 1/134336 349/144 |
| 2015/0234239 A1* | 8/2015 | Son | G02F 1/133753 349/33 |

FOREIGN PATENT DOCUMENTS

| | | |
|---|---|---|
| KR | 10-0810302 | 3/2008 |
| KR | 10-0851743 | 8/2008 |
| KR | 10-2010-0046826 | 5/2010 |

* cited by examiner

*Primary Examiner* — Timothy L Rude
(74) *Attorney, Agent, or Firm* — H.C. Park & Associates, PLC

(57) ABSTRACT

A display device includes a first substrate, a second substrate, and a liquid crystal layer. The first substrate includes pixels, some of the pixels are disposed in a first area and some of the pixels are disposed in a second area. The second substrate is spaced apart from and coupled to the first substrate. The liquid crystal layer is disposed between the first substrate and the second substrate. Each pixel is associated with a viewing angle, an imaginary line extending from a center of the viewing angle, and an angle between a surface of the first substrate and the imaginary line. The angle of a pixel disposed in the first area differs from the angle of a pixel disposed in the second area.

20 Claims, 6 Drawing Sheets

DISPLAY DEVICE

CROSS-REFERENCE TO RELATED APPLICATION

This application claims priority from and the benefit of Korean Patent Application No. 10-2014-0036667, filed on Mar. 28, 2014, which is incorporated by reference for all purposes as if fully set forth herein.

BACKGROUND

1. Field

Exemplary embodiments relate to a display device, and, more particularly, to a display device with an extended area to allow a user to view images.

2. Discussion of the Background

Liquid crystal displays (LCDs) are one type of flat panel display used for displaying images in various devices, such as televisions, monitors, laptops, personal computers (PCs), cellular phones, etc. LCDs operate at a low voltage, consume low power, and may be miniaturized and lightened. It is noted, however, that light provided by a backlight assembly in a typical LCD will usually pass through a liquid crystal layer and a color filter to enable images to be displayed using the light passing through the liquid crystal layer and the color filter. As such, a viewing angle may be more limited than would be in a spontaneous emission display.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device with an extended area allowing a user to view images.

Exemplary embodiments provide a first substrate with an extended area allowing a user to view images.

Additional aspects will be set forth in the detailed description which follows, and, in part, will be apparent from the disclosure, or may be learned by practice of the inventive concept.

According to exemplary embodiments, a display device includes a first substrate, a second substrate, and a liquid crystal layer. The first substrate includes pixels, some of the pixels are disposed in a first area and some of the pixels are disposed in a second area. The second substrate is spaced apart from and coupled to the first substrate. The liquid crystal layer is disposed between the first substrate and the second substrate. Each pixel is associated with a viewing angle, an imaginary line extending from a center of the viewing angle, and an angle between a surface of the first substrate and the imaginary line. The angle of a pixel disposed in the first area differs from the angle of a pixel disposed in the second area.

According to exemplary embodiments, a display substrate includes a first pixel electrode and a second pixel electrode. The first pixel electrode is configured to facilitate the display of images according to a first viewing angle. The second pixel electrode is configured to facilitate the display of images according to a second viewing angle. A first angle between a surface of the display substrate and a first imaginary line bisecting the first viewing angle differs from a second angle between the surface of the display substrate and a second imaginary line bisecting the second viewing angle.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
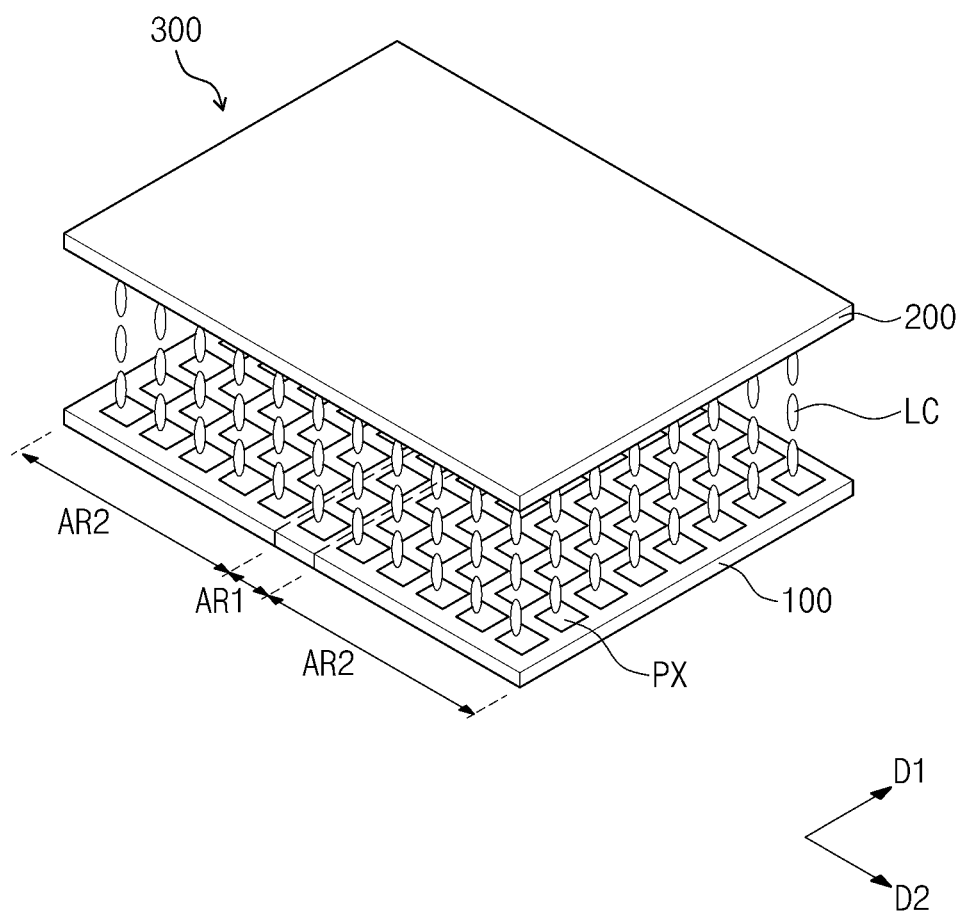
FIG. 1 is a perspective view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view of a display device, according to exemplary embodiments.

Referring to FIG. 1, a display device 300 may include a first substrate 100, a second substrate 200, and a liquid crystal layer. The first substrate 100 includes a plurality of pixels PX. The second substrate 200 is opposite to the first substrate 100 and the second substrate 200 is coupled with the first substrate 100. The liquid crystal layer includes liquid crystal molecules LC, and the liquid crystal layer is disposed between the first substrate 100 and the second substrate 200.

The display device 300 may further include other components in addition to the first substrate 100 and the second substrate 200, but is not limited thereto. For example, the display device 300 may further include a backlight assembly (not shown) outputting light toward the first substrate 100 and the second substrate 200, but is not limited thereto.

The first substrate 100 may be defined with a first area AR1 and a second area AR2. The first area AR1 may be defined as an area disposed with pixels PX arranged in parallel in a center (or center region) of the first substrate 100 in a first direction D1. The second area AR2 may be defined as an area of the first substrate 100 except for the first area AR1.

Figure 2:
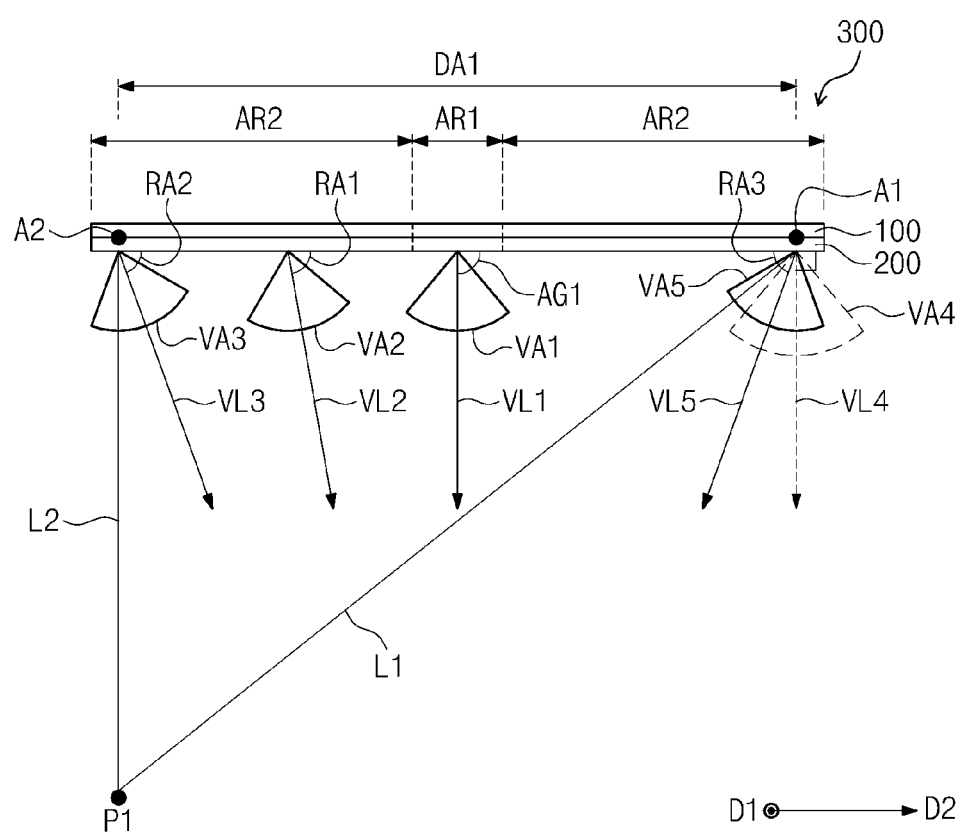
FIG. 2 is a side view of the display device of FIG. 1, according to exemplary embodiments.

FIG. 2 is a side view of the display device of FIG. 1, according to exemplary embodiments. In FIG. 2, some of the plurality of pixels PX are illustrated as an example and a description other pixels will be omitted.

Referring to FIGS. 1 and 2, the display device 300 includes the first substrate 100 including a flat (or substantially flat) display area DA1.

It is noted that an imaginary line is defined as a line extended from a center of the viewing angle of the plurality of pixels PX. Also, an inclination angle is defined as an angle between the imaginary line of a pixel PX disposed in the second area AR2 and a surface of the first substrate 100, which may be smaller than about 90 degrees.

Hereinafter, the viewing angle indicates a sensory viewing angle. The sensory viewing angle may be defined as an angle allowing image quality of images to be maintained in the eyes of an observer, e.g., a user of the display device 300. Different from the sensory viewing angle, a manufacturing viewing angle may be defined as an angle allowing the images displayed by the display device 300 to have a contrast ratio of about 10:1.

Accordingly, although being within a range of the manufacturing viewing angle, images may be deteriorated in luminance and may be discolored in the eyes of the user. The image quality of the sensory viewing angle may be defined using luminance or color coordinates. The luminance designates an amount of light passing through a certain area of the display device 300. The color coordinates, among color, brightness, and chroma (which are three illustrative elements of color), may represent the color and chroma together, except brightness. When the user watches the images in an area out of the range of the viewing angle, the luminance of the images may be deteriorated and the color of the images may be shown differently from the color shown in the range of the viewing angle.

A viewing angle of a pixel PX disposed in the first area AR1 of the first substrate 100 is defined as a first viewing angle VA1, and an imaginary line of the first viewing angle VA1 is defined as a first imaginary line VL1. A viewing angle of a pixel PX disposed in the second area AR2 is defined as a second viewing angle VA2, and an imaginary line of the second viewing angle VA2 is defined as a second imaginary line VL2. A viewing angle of another pixel PX disposed in the second area AR2 of the first substrate 100 is defined as a third viewing angle VA3, and an imaginary line of the third viewing angle VA3 is defined as a third imaginary line VL3.

An angle between the first imaginary line VL1 and a surface of the first substrate 100 is defined as a first angle AG1. An inclination angle between the second imaginary line VL2 and the surface of the first substrate 100 is defined as a first inclination angle RA1. An inclination angle between the third imaginary line VL3 and the surface of the first substrate 100 is defined as a second inclination angle RA2.

The first angle AG1, the first inclination angle RA1, and the second inclination RA2 may have different angle values from one another. For example, the first angle AG1 may be about 90 degrees, whereas the first inclination angle RA1 and the second inclination angle RA2 may be acute angles.

According to exemplary embodiments, the second imaginary line VL2 and the third imaginary line VL3 may incline toward the first area AR1 (e.g., converge upon the first imaginary line VL1), and the second imaginary line VL2 and third imaginary line VL3 may have different inclination angle values from one another. For example, since a pixel PX having the second imaginary line VL2 is disposed more adjacently to the first area AR1 than a pixel PX having the third imaginary line VL3, the first inclination angle RA1 may be greater than the second inclination angle RA2. As a pixel PX disposed in the second area AR2 becomes closer to the first area AR1, the inclination angle of such a pixel PX may approach about 90 degrees. Also, as the pixel PX disposed in the second area AR2 becomes further away from the first area AR1, the inclination angle of such a pixel PX may become smaller.

According to a comparative example, when all angles between imaginary lines of the respective pixels PX and the first substrate 100 are identical, image quality of the periphery of the first substrate 100 may be deteriorated according to a viewing point of the user. For example, when a viewing angle of a pixel PX disposed in a first spot A1 of the second area AR2 is defined as a fourth viewing angle VA4, and an imaginary line of the fourth viewing angle VA4 is defined as a fourth imaginary line VL4, an inclination angle between the fourth imaginary line VL4 and the surface of the first substrate 100 may be about 90 degrees. When the viewing point is on a first point P1, a sight line on the first point P1 may be defined as from a first line L1 to a second line L2. In this manner, since the second line L2 is within a range of the third viewing angle VA3, the image quality may not be deteriorated. However, the first line L1 is out of range of the fourth viewing angle VA4. As a result, when the user sees the first spot A1 from the first point P1, the user may perceive images of deteriorated image quality.

According to exemplary embodiments, a viewing angle at the first spot A1 varies from the fourth viewing angle VA4 to a fifth viewing angle VA5. An imaginary line of the fifth viewing angle VA5 is defined as a fifth imaginary line VL5. An inclination angle between the fifth imaginary line VL5 and the surface of the first substrate 100 is defined as a third inclination angle RA3. In this manner, when watching the first spot A1 from the first point P1, the first line L1 falls within a range of the fifth viewing angle VA5. Accordingly, although the user watches a screen from the first point P1, different from the comparative example described above, image quality of images viewed at the first spot A1 are not deteriorated. That is, according to exemplary embodiments, an area for watching images within a range not deteriorated with image quality is broader than the comparative example.

In exemplary embodiments, when a distance between the first area AR1 and the first spot A1 is identical (or substantially identical) to a distance between the first area AR1 and a second spot A2, the second inclination angle RA2 and the third inclination angle RA3 may be identical (or substantially identical) to each other. Also, inclination angles of pixels PX arranged parallel in the first direction D1 among the plurality of pixels PX may be identical (or substantially identical) to one another.

According to a purpose or size of the display device 300, an angle between an imaginary line and the surface of the first substrate 100 may vary. For example, as the size of the display device 300 increases, the inclination angle may decrease.

Figure 3:
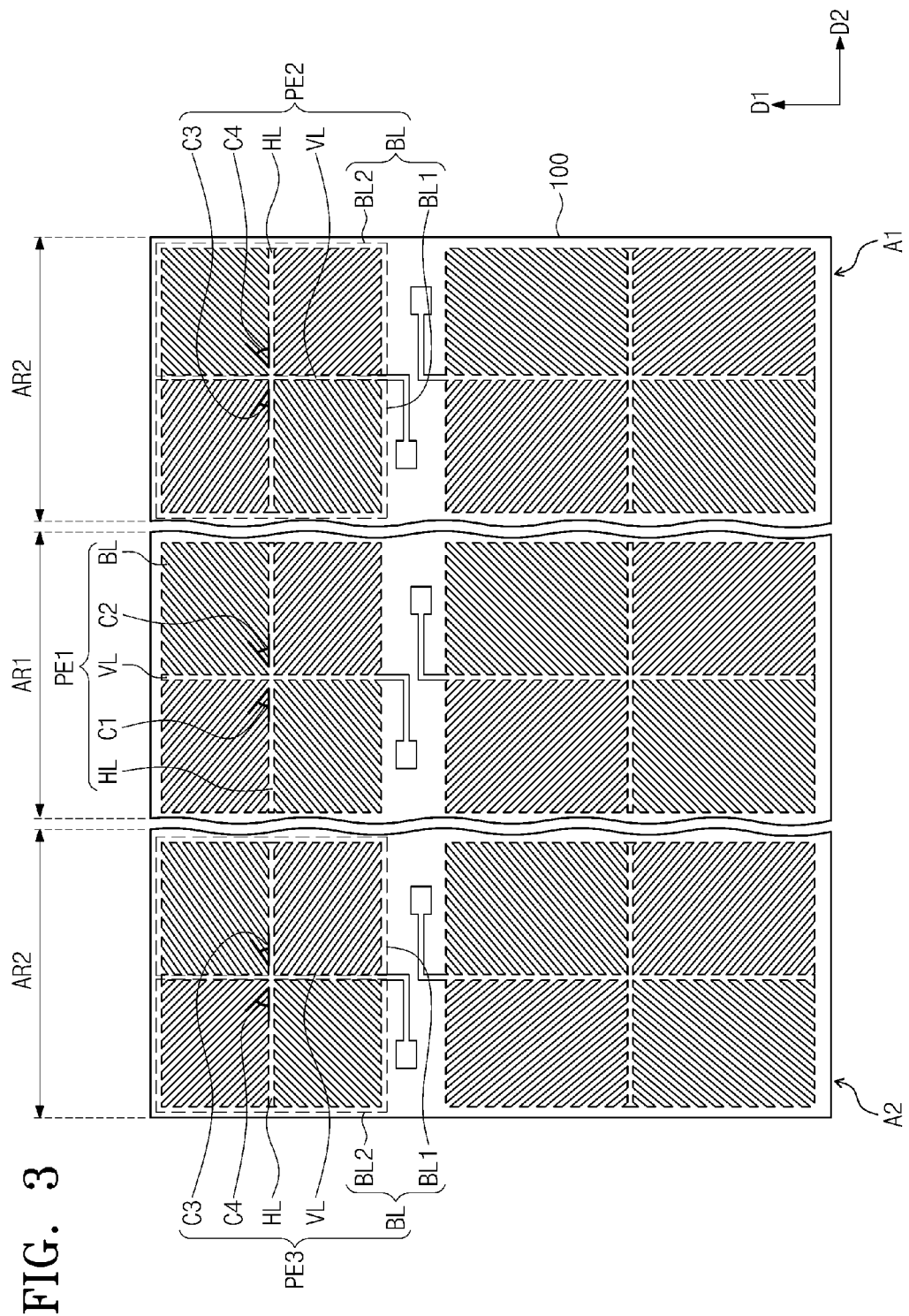
FIG. 3 is a plan view of pixel electrodes of a first substrate of the display device of FIG. 1, according to exemplary embodiments.

FIG. 3 is a plan view of pixel electrodes of a first substrate of the display device of FIG. 1, according to exemplary embodiments.

Referring to FIGS. 2 and 3, the first substrate 100 includes a first pixel electrode PE1 disposed on a spot of the first area AR1, a second pixel electrode PE2 disposed in association with the first spot A1 of the second area AR2, and a third pixel electrode PE3 disposed in association with the second spot A2 of the second area AR2.

The respective first to third pixel electrodes PE1, PE2, and PE3 may be divided into a first sub-pixel electrode and a second sub-pixel electrode. The first sub-pixel electrode and the second sub-pixel electrode may be disposed parallel to one another on the first substrate 100 in the first direction D1. In exemplary embodiments, a size of the second sub-pixel electrode may differ from a size of the first sub-pixel electrode. However, a shape of the second sub-pixel electrode may be similar to a shape of the first sub-pixel electrode.

An exemplary configuration of the first pixel electrode PE1 disposed in association with the first area AR1 among the first to third pixel electrodes PE1, PE2, and PE3 will be described as follows. The first pixel electrode PE1 may include a horizontal electrode line HL, a vertical electrode line VL, and branch electrode lines BL. The vertical electrode line VL may extend in the first direction D1 and the horizontal electrode line HL may extend in a second direction D2 intersecting the first direction D1. The horizontal electrode line HL may be connected to and intersecting with the vertical electrode line VL. The first direction D1 may be perpendicular to the second direction D2. Individual branch electrode lines BL may be radially extended from one of the horizontal electrode line HL and the vertical electrode line VL.

A first branch electrode line angle C1 between branch electrode lines BL on one side of the vertical electrode line VL of the first pixel electrode PE1 and the horizontal electrode line HL may be identical in value to a second branch electrode line angle C2 between branch electrode lines BL on another side of the vertical electrode line VL and the horizontal electrode line HL.

The branch electrode lines BL of the respective second pixel electrode PE2 and third pixel electrode PE3 may include first branch electrode lines BL1 and second branch electrode lines BL2. The first branch electrode lines BL1 and the second branch electrode lines BL2 may be disposed on the first substrate 100 with the vertical electrode line VL disposed therebetween. The first branch electrode lines BL1 may be defined as some of the branch electrode lines BL that are closer to the first area AR1 than the second branch electrode lines BL2. In the second area AR2, a third branch electrode line angle C3 between the first branch electrode lines BL1 and the horizontal electrode line HL may be smaller than a fourth branch electrode line angle C4 between the second branch electrode lines BL2 and the horizontal electrode line HL.

Given that the first branch electrode line angle C1 may be identical to the second branch electrode line angle C2, an angle between an imaginary line of a pixel PX including the first pixel electrode PE1 and the first substrate 100 may be about 90 degrees. Also, given that the third branch electrode line angle C3 differs from the fourth branch electrode line angle C4, the second inclination angle RA2 and the third inclination angle RA3 of corresponding pixels PX respectively including the second pixel electrode PE2 and the third pixel electrode PE3 may be smaller than about 90 degrees. To this end, as corresponding distances between the second pixel electrode PE2 and the first area AR1 and the third pixel electrode PE3 and the first area AR1 increases, a difference between the third branch electrode line angle C3 and the fourth branch electrode line angle C4 may also increase. As the difference between the third branch electrode line angle C3 and the fourth branch electrode line angle C4 increases, the second inclination angle RA2 and the third inclination angle RA3 may become smaller. Furthermore, a distance between the first spot A1 and the first area AR1 may be identical (or substantially identical) to a distance between the second spot A2 and the first area AR1. Accordingly, the second pixel electrode PE2 and the third pixel electrode PE3 may have shapes symmetrical (or substantially symmetrical) to each other. In this manner, the first area AR1 may be disposed between the aforementioned shapes of the second pixel electrode PE2 and the third pixel electrode PE3.

In exemplary embodiments, the first branch electrode line angle C1 and the second branch electrode line angle C2 may be about 40 degrees, the third branch electrode line angle C3 may be about 35 degrees, and the fourth branch electrode line angle C4 may be about 45 degrees. A sum of the first branch electrode line angle C1 and the second branch electrode line angle C2 may be identical (or substantially identical) to a sum of the third branch electrode line angle C3 and the fourth branch electrode line angle C4. Accordingly, viewing angles of the respective pixels PX (refer to FIG. 1) may be identical to one another.

Figure 4:
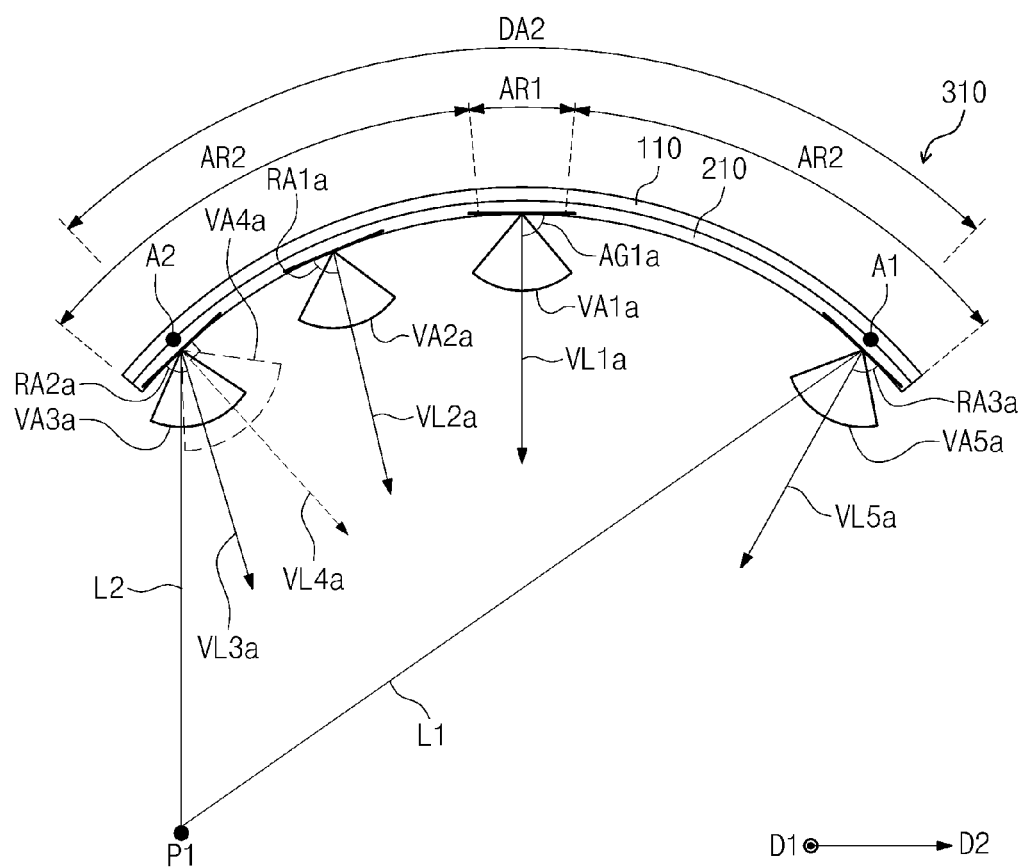
FIG. 4 is a side view of a display device, according to exemplary embodiments.

FIG. 4 is a side view of a display device, according to exemplary embodiments. Referring to FIG. 4, a display device 310 has a curved shape. Accordingly, the display device 310 may display images to improve a three-dimensional effect, a sense of involvement, and a sense of presence than flat panel displays. Display device 301 achieves these features, among others, by using a display area DA2 having a curved shape.

In exemplary embodiments, the display device 310 includes a first substrate 110, a second substrate 210, and a liquid crystal layer (not shown), which may be disposed between the first substrate 110 and the second substrate 210. The first substrate 110 is curved in a second direction D2 from a plane, or, in other words, the first substrate 110 is curved about an imaginary axis extending in the first direction D1. Accordingly, the first substrate 110 may have the display area DA2 having the curved shape. Also, the second substrate 210 may have a curved shape together with the first substrate 110.

An imaginary line used in the following description designates a line extended from a center (or central area) of a viewing angle of each of a plurality of pixels (not shown) disposed on the first substrate 110. Also, an inclination angle designates an angle between an imaginary line of a pixel disposed in a second area AR2 of the first substrate 110 and a tangent line of a surface of the first substrate 110 defined in a location of the pixel disposed in the second area AR2. In exemplary embodiments, the inclination angle may be smaller than about 90 degrees. Also, for convenience, the respective tangent lines of the first substrate 110 are indicated on the second substrate 210.

A viewing angle of a pixel disposed in a first area AR1 of the first substrate 110 is defined as a first viewing angle VA1$a$, and an imaginary line of the first viewing angle VA1$a$ is defined as a first imaginary line VL1$a$. A viewing angle of a pixel disposed in the second area AR2 of the first substrate 110 is defined as a second viewing angle VA2$a$, and an imaginary line of the second viewing angle VA2$a$ is defined as a second imaginary line VL2$a$. A viewing angle of a pixel disposed in a second spot A2 of the first substrate 110 is defined as a third viewing angle VA3$a$, and an imaginary line of the third viewing angle VA3$a$ is defined as a third imaginary line VL3$a$. A viewing angle of a pixel disposed in a first spot A1 of the first substrate 110 is defined as a fifth viewing angle VA5$a$, and an imaginary line of the fifth viewing angle VA5$a$ is defined as a fifth imaginary line VL5$a$.

An angle between the first imaginary line VL1$a$ and a tangent line of the first substrate 110 defined in a location of a pixel including the first imaginary line VL1$a$ is defined as a first angle AG1$a$. An inclination angle between the second imaginary line VL2$a$ and a tangent line of the first substrate 110 is defined as a first inclination angle RA1$a$. An inclination angle between the third imaginary line VL3$a$ and a tangent of the first substrate 110 is defined as a second inclination angle RA2$a$. An inclination angle between the fifth imaginary line VL5$a$ and a tangent of the first substrate 110 is defined as a third inclination angle RA3$a$.

In exemplary embodiments, the first angle AG1$a$ may be about 90 degrees and the respective first to third inclination angles RA1$a$, RA2$a$, and RA3$a$ may be smaller than about 90 degrees. To this end, it is noted that an imaginary line of a pixel disposed in the second area AR2 may be inclined less towards the first area AR1 with increasing distance from the first area AR1. Accordingly, the second imaginary line VL2$a$, the third imaginary line VL3$a$, and the fifth imaginary line VL5$a$ may be inclined towards the first area AR1, but at different inclination angles. For example, the second and third imaginary lines VL2$a$ and VL3$a$ may have mutually different inclination angles. For example, since a pixel having the second imaginary line VL2$a$ may be disposed more adjacently to the first area AR1 than a pixel having the third imaginary line VL3$a$, the first inclination angle RA1$a$ may be greater than the second inclination angle RA2$a$. In this manner, as a pixel disposed in the second area AR2 is disposed closer to the first area AR1, an inclination angle of such a pixel may be closer to 90 degrees. Also, as a pixel disposed in the second area AR2 is disposed further from the first area AR1, an inclination angle of such a pixel may become smaller.

According to a comparative example, all angles between imaginary lines of respective pixels and tangent lines of the first substrate 110 defined in locations of pixels having the imaginary lines are identical to one another. In this manner, when a viewing angle of a pixel disposed in association with the second spot A2 of the second area AR2 is defined as a fourth viewing angle VA4$a$ and an imaginary line of the fourth viewing angle VA4$a$ is defined as a fourth imaginary line VL4$a$, an inclination angle between the fourth imaginary line VL4$a$ and the first substrate 110 may be about 90 degrees. Accordingly, when observing the second spot A2 from a first point P1, a second line L2 of the first point P1 is out of a range of the fourth viewing angle VA4$a$. As such, when observing the second spot A2 from the first point P1, a user may perceive images that are deteriorated in image quality.

According to exemplary embodiments, however, a viewing angle at the second spot A2 varies from the fourth viewing angle VA4$a$ to the third viewing angle VA3$a$, such that the second line L2 is within a range of the third viewing angle VA3$a$. Accordingly, although watching a screen from the first point P1, differently from the comparative example described above, images are not deteriorated in image quality at the second spot A2. That is, according to exemplary embodiments, an area for watching images that are not deteriorated in image quality is broader than the comparative example.

Also, different from exemplary embodiments, unless the image quality is deteriorated, a curvature radius of the display device 310 may be allowed to be greater to enlarge a viewing point area. However, when the curvature radius increases too much, a sense of perspective and involvement of the curved display area may be further deteriorated. In exemplary embodiments, however, it is possible to enlarge the viewing point area that is not deteriorated in image quality and maintain the sense of perspective and involvement of the curved display area.

In exemplary embodiments, the inclination angle may vary with a length of the curvature radius of the display device 310. For example, as the length of the curvature radius increases, the second inclination angle RA2a may also increase.

Figure 5:
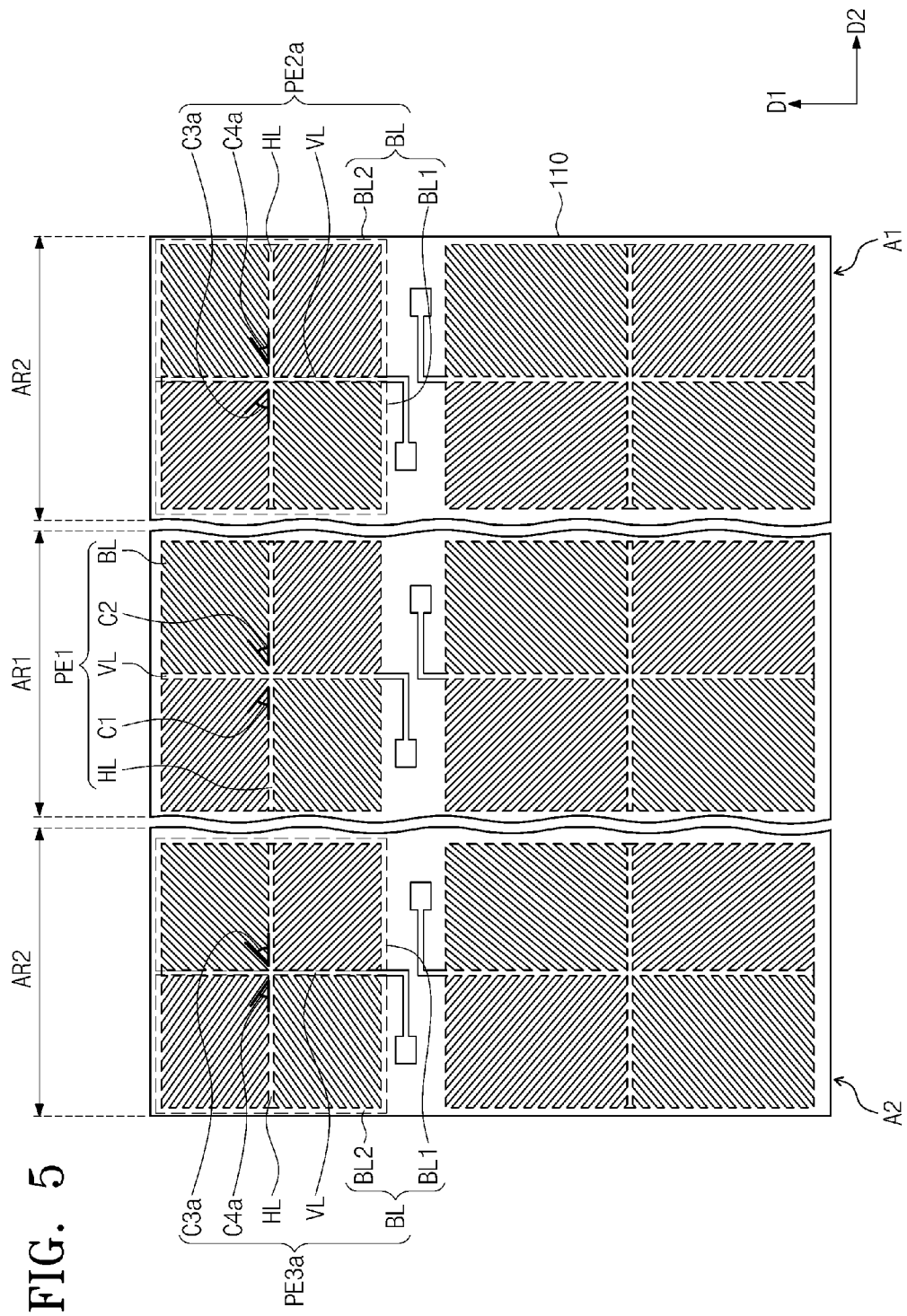
FIG. 5 is a plan view of pixel electrodes of a first substrate of the display device of FIG. 4, according to exemplary embodiments.

FIG. 5 is a plan view of pixel electrodes of a first substrate of the display device of FIG. 4, according to exemplary embodiments. The first substrate of FIG. 5 is substantially similar to the first substrate of FIG. 3. Therefore, to avoid obscuring exemplary embodiments described herein, a repetitive description of similar components will be omitted.

Referring to FIGS. 4 and 5, the first substrate 110 includes a first pixel electrode PE1 disposed on a spot of the first area AR1, a second pixel electrode PE2a disposed in association with the first spot A1 of the second area AR2, and a third pixel electrode PE3a disposed in association with the second spot A2 of the second area AR2.

A first branch electrode line angle C1 between branch electrode lines BL on a first side of a vertical electrode line VL of the first pixel electrode PE1 and a horizontal electrode line HL may be identical (or substantially identical) to a second branch electrode line angle C2 between branch electrode lines BL on a second side of the vertical electrode line VL and the horizontal electrode line HL. Respective third branch electrode line angles C3a between first branch electrode lines BL1 and horizontal electrode lines HL of the respective second and third pixel electrodes PE2a and PE3a may be greater than corresponding fourth branch electrode line angles C4a between second branch electrode lines BL2 and the horizontal electrode lines HL of the respective second and third pixel electrodes PE2a and PE3a. As distances between the respective second and third pixel electrodes PE2a and PE3a and the first area AR1 increases, a difference between the third branch electrode line angles C3a and the fourth branch electrode line angles C4a may increase. As the difference between the third branch electrode line angles C3a and the fourth branch electrode line angles C4a increases, the second and third inclination angles RA2a and RA3a may become smaller.

In exemplary embodiments, the first branch electrode line angle C1 and the second branch electrode line angle C2 may be about 40 degrees, the third branch electrode line angle C3a may be about 45 degrees, and the fourth branch electrode line angle C4a may be about 35 degrees. A sum of the first branch electrode line angle C1 and the second branch electrode line angle C2 may be identical (or substantially identical) to a sum of the third branch electrode line angle C3a and the fourth branch electrode line angle C4a. As such, viewing angles of the respective pixels may be identical (or substantially identical) to one another.

Figure 6:
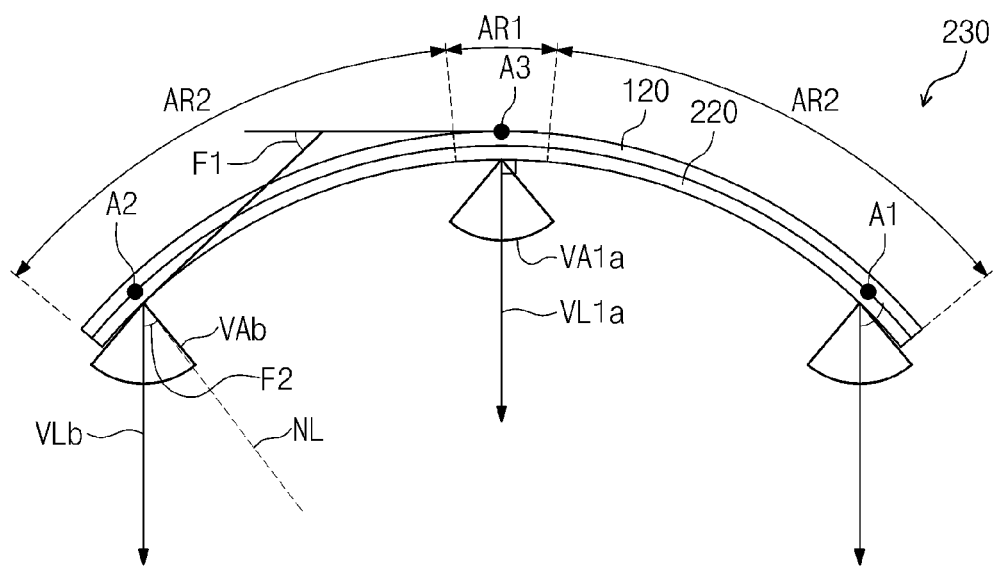
FIG. 6 is a side view of a display device, according to exemplary embodiments.

FIG. 6 is a side view of a display device, according to exemplary embodiments. The display device of FIG. 6 is substantially similar to the display device of FIG. 4. Therefore, to avoid obscuring exemplary embodiments described herein, a repetitive description of similar components will be omitted.

Referring to FIG. 6, the display device 230 has a curved shape. The display device 230 may include a first substrate 120, a second substrate 220, and a liquid crystal layer (not shown) disposed between the first substrate 120 and the second substrate 220. A viewing angle of a pixel (not shown) disposed in association with a second spot A2 of the first substrate 120 is defined as a second viewing angle VAb, and an imaginary line of the second viewing angle VAb is defined as a second imaginary line VLb.

An angle between a tangent line defined at a central spot A3 of the first area AR1 of the first substrate 120 and a tangent line defined at the second spot A2 is defined as a tangent line angle F1. An angle between the second imaginary line VLb and a normal line NL at the second spot A2 of the first substrate 120 is defined as a normal line angle F2. The tangent line angle F1 may be identical (or substantially identical) to the normal line angle F2. As such, imaginary lines of each pixel may be parallel to one another.

According to exemplary embodiments, in a curved display device 230 curved with a curvature radius of the first substrate 120, the imaginary lines may be curved too. For example, when the second spot A2 is curved by about 5 degrees about the third spot A3, the second imaginary line VLb may rotate in a counterclockwise fashion from the normal line NL by about 5 degrees. Accordingly, not only may the area allowing a user watching the screen to watch images that are not deteriorated with image quality increase, but also the sense of perspective and involvement of the display device 230 having the curved shape may be maintained.

According to exemplary embodiments, angles between imaginary lines of respective pixels disposed on a first substrate and a surface of the first substrate may vary with the locations of the corresponding pixels. Accordingly, better image quality may be obtained from other vantage points besides a central vantage point at a center of the display device. That is, an area allowing the user to watch images that are not deteriorated with image quality may increase.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a first substrate comprising pixels, some of the pixels being disposed in a first area and some of the pixels being disposed in a second area;
a second substrate spaced apart from and coupled to the first substrate; and
a liquid crystal layer disposed between the first substrate and the second substrate,
wherein each pixel is associated with a viewing angle, an imaginary line extending from a center of the viewing angle, and a crossing angle between a surface of the first substrate and the imaginary line, and
wherein the crossing angle of a pixel disposed in the first area differs from the crossing angle of a pixel disposed in the second area.

2. The display device of claim 1, wherein:
the first area is defined as an area disposed with pixels arranged from a center of the display substrate in a first direction, and
wherein the second area is defined as an area of the display substrate except the first area.

3. The display device of claim 2, wherein:
the crossing angle of the pixel disposed in the first area is about 90 degrees; and
the crossing angle of the pixel disposed in the second area is less than about 90 degrees.

4. The display device of claim 3, wherein the closer the pixel disposed in the second area is to the first area, the closer the crossing angle of the pixel disposed in the second area is to about 90 degrees.

5. The display device of claim 3, wherein the first substrate comprises a substantially flat display area.

6. The display device of claim 5, wherein:
the imaginary line of the pixel disposed in the second area is inclined toward the first area; and
the further the pixel disposed in the second area is from the first area, the more inclined the imaginary line of the pixel disposed in the second area is towards the first area.

7. The display device of claim 2, wherein:
the first substrate and the second substrate are curved in a second direction intersecting the first direction; and
the first substrate comprises a curved display area.

8. The display device of claim 7, wherein:
the crossing angle of the pixel disposed in the first area is between a tangent line to the surface of the first substrate in a location of the pixel disposed in the first area, the crossing angle of the pixel disposed in the first area is about 90 degrees; and
the crossing angle of the pixel disposed in the second area is between a tangent line to the surface of the first substrate in a location of the pixel disposed in the second area, the crossing angle of the pixel disposed in the second area is less than about 90 degrees.

9. The display device of claim 8, wherein:
the imaginary line of the pixel disposed in the second area is inclined toward the first area; and
the closer the pixel disposed in the second area is to the first area, the closer the crossing angle of the pixel disposed in the second area is to about 90 degrees.

10. The display device of claim 9, wherein the imaginary line of the pixel disposed in the first area is substantially parallel to the imaginary line of the pixel disposed in the second area.

11. The display device of claim 2, wherein a configuration of a pixel electrode of the pixel disposed in the first area differs from a configuration of a pixel electrode of the pixel disposed in the second area.

12. The display device of claim 11, wherein each of the pixels comprises a pixel electrode, each pixel electrode comprises:
a horizontal electrode line extending in the first direction;
a vertical electrode line extending in a second direction intersecting the first direction, the vertical electrode line being connected to the horizontal electrode line; and
branch electrode lines, each branch electrode line radially extending from one of the horizontal electrode line and the vertical electrode line.

13. The display device of claim 12, wherein:
the branch electrode lines of the pixel disposed in the second area comprise first branch electrode lines and second branch electrode lines;

the vertical electrode line is disposed between the first branch electrode lines and the second branch electrode lines; and
the first branch electrode lines are disposed closer to the first area than the second branch electrode lines.

14. The display device of claim 13, wherein:
a first branch electrode line angle between the branch electrode lines on a first side of the vertical electrode line of the pixel electrode of the pixel disposed in the first area and the horizontal electrode line of the pixel electrode of the pixel disposed in the first area is substantially identical to a second branch electrode line angle between the branch electrode lines on a second side of the vertical electrode line of the pixel electrode of the pixel disposed in the first area and the horizontal electrode line of the pixel electrode of the pixel disposed in the first area; and
a third branch electrode line angle between the first branch electrode lines and the horizontal electrode line of the pixel electrode of the pixel disposed in the second area differs from a fourth branch electrode line angle between the second branch electrodes lines and the horizontal electrode line of the pixel electrode of the pixel disposed in the second area.

15. The display device of claim 14, wherein:
the first substrate comprises a substantially flat display area; and
the third branch electrode line angle is smaller than the fourth branch electrode line angle.

16. The display device of claim 14, wherein:
the first substrate comprises a curved display area; and
the third branch electrode line angle is greater than the fourth branch electrode line angle.

17. The display device of claim 14, wherein a sum of the first branch electrode line angle and the second branch electrode line angle is substantially identical to a sum of the third branch electrode line angle and the fourth branch electrode line angle.

18. The display device of claim 2, wherein the viewing angles of the pixels are substantially identical to one another.

19. The display device of claim 2, the crossing angles of pixels disposed in the second area vary with the spatial position of the pixels disposed in the second area.

20. A display substrate, comprising:
a first pixel electrode configured to facilitate display of images according to a first viewing angle; and
a second pixel electrode configured to facilitate the display of images according to a second viewing angle,
wherein a first angle between a surface of the display substrate and a first imaginary line bisecting the first viewing angle differs from a second angle between the surface of the display substrate and a second imaginary line bisecting the second viewing angle.

* * * * *